US 11,548,426 B2
(12) United States Patent
Zarraga et al.

(10) Patent No.: US 11,548,426 B2
(45) Date of Patent: Jan. 10, 2023

(54) HANDLE ASSEMBLY FOR A VEHICLE

(71) Applicant: Ford Global Technologies, LLC, Dearborn, MI (US)

(72) Inventors: Kevin Zarraga, Cuautitlan Izcalli (MX); Victor Negrete Cortés, Mexico City (MX); Karla Patricia Murguia Rendon, Mexico City (MX)

(73) Assignee: Ford Global Technologies, LLC, Dearborn, MI (US)

( * ) Notice: Subject to any disclaimer, the term of this patent is extended or adjusted under 35 U.S.C. 154(b) by 196 days.

(21) Appl. No.: 17/111,793

(22) Filed: Dec. 4, 2020

(65) Prior Publication Data
US 2022/0176860 A1 Jun. 9, 2022

(51) Int. Cl.
*B60N 3/02* (2006.01)
*B62D 25/04* (2006.01)

(52) U.S. Cl.
CPC ............ *B60N 3/023* (2013.01); *B60N 3/026* (2013.01); *B62D 25/04* (2013.01)

(58) Field of Classification Search
CPC .................. B60N 3/023; B60N 3/026; B60R 2013/0287; B62D 25/04
USPC ....................................................... 296/1.02
See application file for complete search history.

(56) References Cited

U.S. PATENT DOCUMENTS

| | | | | |
|---|---|---|---|---|
| 2,688,288 | A * | 9/1954 | Harris | B61D 49/00 105/354 |
| 3,145,050 | A * | 8/1964 | Edwards | B60N 3/026 74/DIG. 10 |
| 7,611,162 | B2 * | 11/2009 | Kim | B60R 11/0223 296/187.05 |
| 8,636,313 | B2 | 1/2014 | Huelke et al. | |
| 8,708,386 | B2 | 4/2014 | Abe et al. | |
| 9,821,696 | B1 | 11/2017 | Logan, Jr. et al. | |
| 2003/0016327 | A1 | 1/2003 | Kotchick et al. | |
| 2020/0158281 | A1 * | 5/2020 | Carnevali | F16M 13/022 |
| 2020/0189437 | A1 * | 6/2020 | Patterson | B60N 3/026 |

FOREIGN PATENT DOCUMENTS

| | | | | |
|---|---|---|---|---|
| CN | 1733528 | A * | 2/2006 | ............ A62B 3/00 |
| DE | 10146843 | A1 * | 4/2002 | ............ B60N 3/023 |
| DE | 202013104126 | U1 * | 11/2013 | ............ B60N 3/02 |

(Continued)

OTHER PUBLICATIONS

Machine translation of DE-10146843-A.*
Machine translation of KR-19980053297-U.*

*Primary Examiner* — D Glenn Dayoan
*Assistant Examiner* — Kevin P Weldon
(74) *Attorney, Agent, or Firm* — Vichit Chea; Price Heneveld LLP

(57) ABSTRACT

A handle assembly for a vehicle includes a rail. The rail includes retention flanges that each define a channel. A handle is disposed within the channel and is operably coupled to the rail. The handle includes a body that defines a grasping portion and at least one attachment end. A latch feature is operably coupled to the at least one attachment end of the handle. The latch feature includes a retention member that is coupled to a pivot feature. The latch feature also includes a lever. A cable is operably coupled to the lever of the latch feature and is configured to translate the latch feature between an engaged position and a retracted position.

12 Claims, 11 Drawing Sheets

(56) References Cited

FOREIGN PATENT DOCUMENTS

| KR | 19980053297 U | * | 10/1998 | |
|----|---------------|---|---------|--|
| WO | WO-2009035602 A1 | * | 3/2009 | ............. B60N 3/026 |
| WO | WO-2009041768 A2 | * | 4/2009 | ............. B60N 3/023 |

* cited by examiner

HANDLE ASSEMBLY FOR A VEHICLE

FIELD OF THE DISCLOSURE

The present disclosure generally relates to a pillar assembly for a vehicle. More specifically, the present disclosure generally relates to a handle assembly for a pillar assembly.

BACKGROUND OF THE DISCLOSURE

Vehicles often have handles that assist occupants when entering and exiting the vehicle. The handles are typically positioned toward an upper portion of a pillar of the vehicle proximate to the door.

SUMMARY OF THE DISCLOSURE

According to a first aspect of the present disclosure, a vehicle includes a vehicle floor. A pillar is operably coupled to the vehicle floor. A handle assembly is proximate to the vehicle floor and is operably coupled to the pillar. The handle assembly includes a rail that has a first surface, a second surface, and a plurality of apertures defined along the first and second surfaces. The first surface includes retention flanges that define a channel along the first surface. A latch feature is selectively disposed within at least one of the plurality of apertures. The latch feature includes a retention member that is coupled to a pivot feature. The latch feature also includes a lever. A handle is operably coupled to the latch feature and includes a body that defines a grasping portion and at least one attachment end.

Embodiments of the first aspect of the disclosure can include any one or a combination of the following features:
  a cable is operably coupled to the lever of the latch feature and is configured to translate the retention member between an engaged position and a retracted position;
  the handle includes an adjustment feature that is operably coupled to the latch feature via the cable;
  the adjustment feature is configured to translate the retention member between the engaged position and the retracted position;
  the handle includes an actuator that is operably coupled to the cable and is configured to actuate the lever of the latch feature;
  the handle includes a loop strap that is operably coupled to the latch feature;
  the handle is operable between a first position and a plurality of second positions; and/or
  the retention member is in a retracted position as the handle translates from the first position to one of the plurality of second positions.

According to a second aspect of the present disclosure, a handle assembly for a vehicle includes a rail. The rail includes retention flanges that each define a channel. A handle is disposed within the channel and is operably coupled to the rail. The handle includes a body that defines a grasping portion and at least one attachment end. A latch feature is operably coupled to the at least one attachment end of the handle. The latch feature includes a retention member that is coupled to a pivot feature. The latch feature also includes a lever. A cable is operably coupled to the lever of the latch feature and is configured to translate the latch feature between an engaged position and a retracted position.

Embodiments of the second aspect of the disclosure can include any one or a combination of the following features:
  the rail has a first surface, a second surface, and a plurality of apertures defined along the first and second surfaces;
  the retention member is selectively disposed within at least one of the plurality of apertures defined by the rail;
  the handle includes an adjustment feature and an actuator that is operably coupled to the adjustment feature;
  the adjustment feature is operably coupled to the cable and is configured to translate the latch feature between the engaged position and the retracted position; and/or
  the handle is coupled to the rail at a first position and is configured to translate along the rail to a second position.

According to a third aspect of the present disclosure, a pillar assembly for a vehicle includes a pillar that is operably coupled to a floor of said vehicle. A handle assembly is operably coupled to the pillar proximate to the vehicle floor. The handle assembly includes a rail that has a first surface, a second surface, and a plurality of apertures defined along the first and second surfaces. The first surface includes retention flanges that each define a channel along the first surface. A handle is operably coupled to the rail and at least one attachment end and a latch feature that is disposed proximate to the at least one attachment end.

Embodiments of the third aspect of the disclosure can include any one or a combination of the following features:
  the latch feature includes a retention member and a lever that are operably coupled to the at least one attachment end;
  a cable is operably coupled to the lever of the latch feature and is configured to translate the retention member between an engaged position and a retracted position;
  the retention member is coupled to a pivot feature;
  the cable engages the lever to rotate the retention member via the pivot feature into the retracted position;
  the handle is a loop strap;
  the at least one attachment end includes a first attachment end and a second attachment end;
  the first attachment end includes the latch feature;
  the second attachment end includes a retention block that is slidably coupled to the retention flanges of the rail; and/or
  the handle is operable between a first position, a second position, and a plurality of intermediate positions therebetween.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Additional features and advantages of the presently disclosed device will be set forth in the detailed description which follows and will be apparent to those skilled in the art from the description, or recognized by practicing the device as described in the following description, together with the claims and appended drawings.

Figure 1:
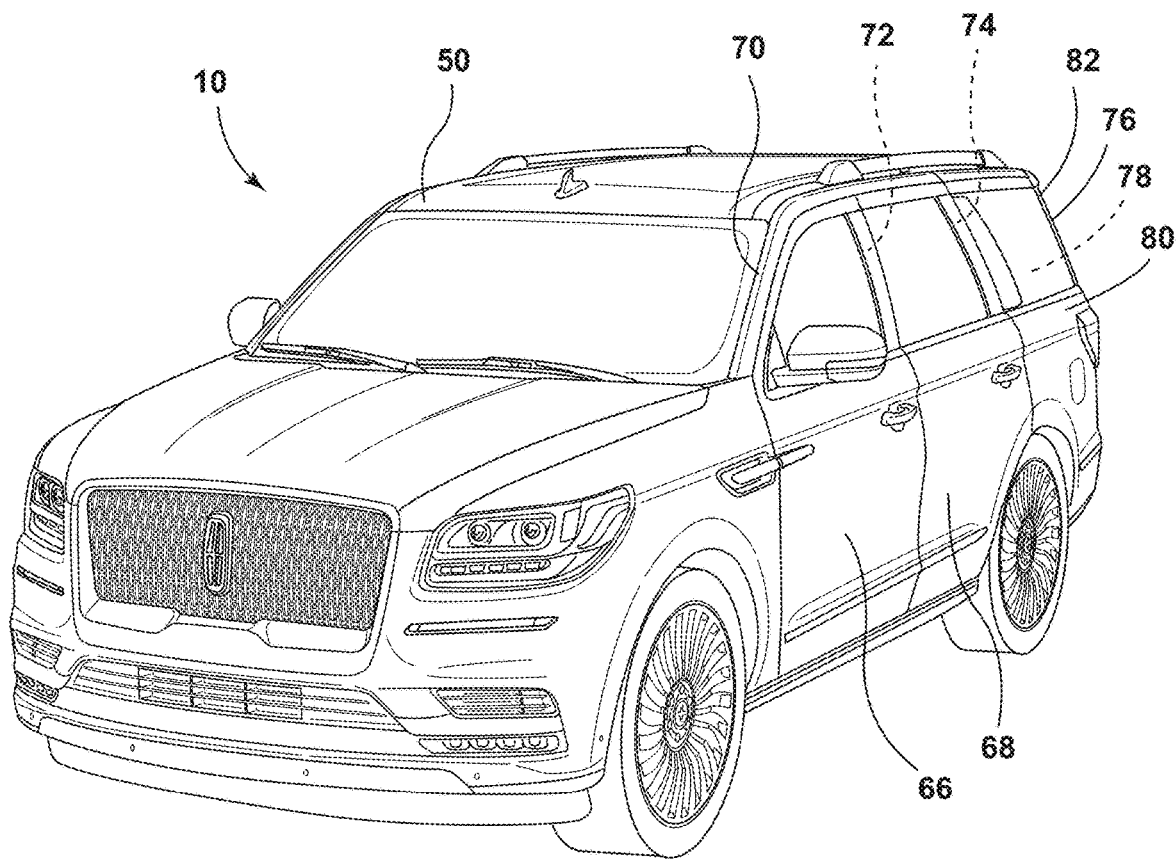
FIG. 1 is a front perspective view of a vehicle of the present disclosure.
Figure 2:
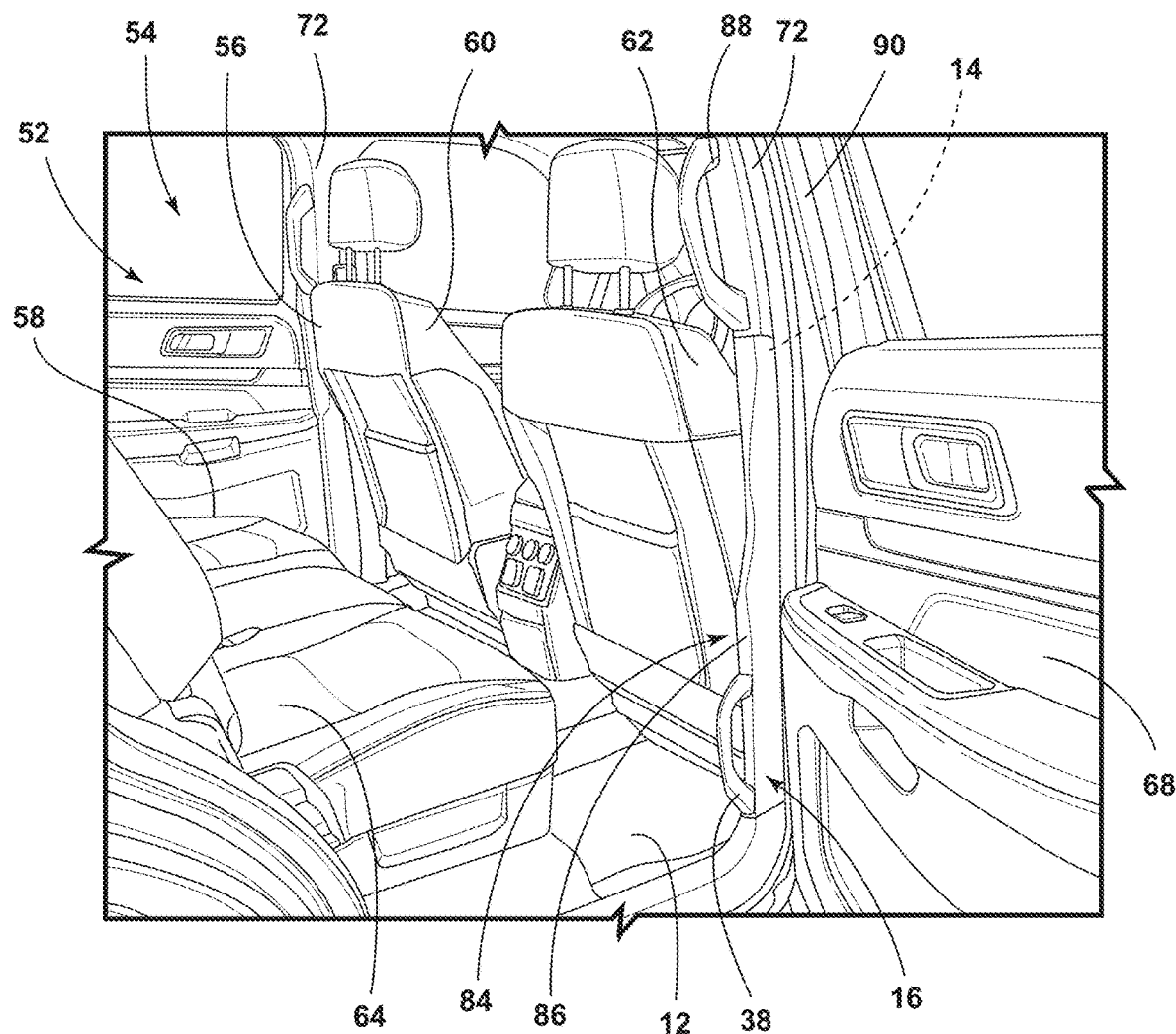
FIG. 2 is a partial enlarged view of an interior of the vehicle of FIG. 1 with a pillar assembly of the present disclosure.
Figure 3:
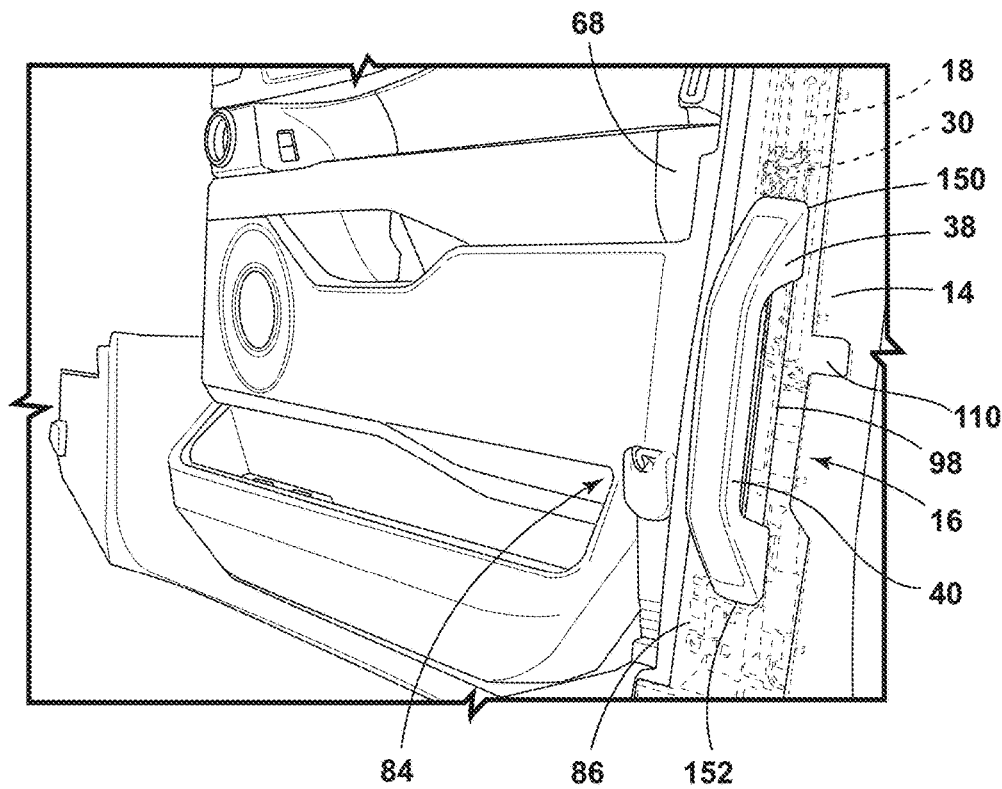
FIG. 3 is a partial enlarged view of a rear passenger door with a pillar assembly of the present disclosure.
Figure 4:
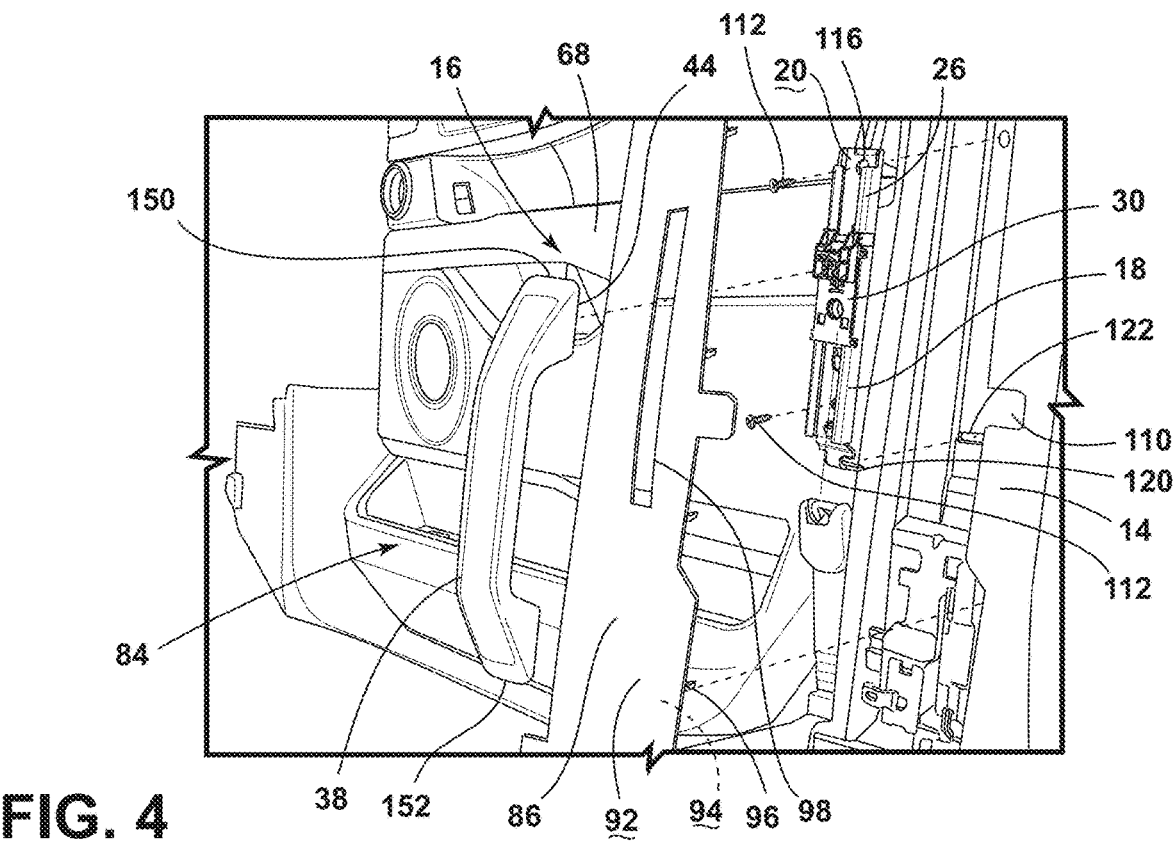
FIG. 4 is a partial enlarged exploded view of the pillar assembly of FIG. 3 with a handle, a trim panel, and a rail of the present disclosure.
Figure 5A:
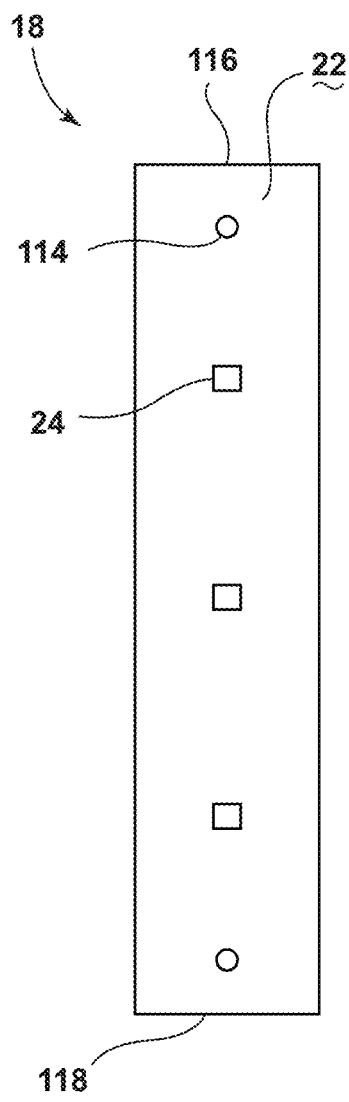
FIG. 5A is a rear elevational view of a rail of the present disclosure.
Figure 5B:
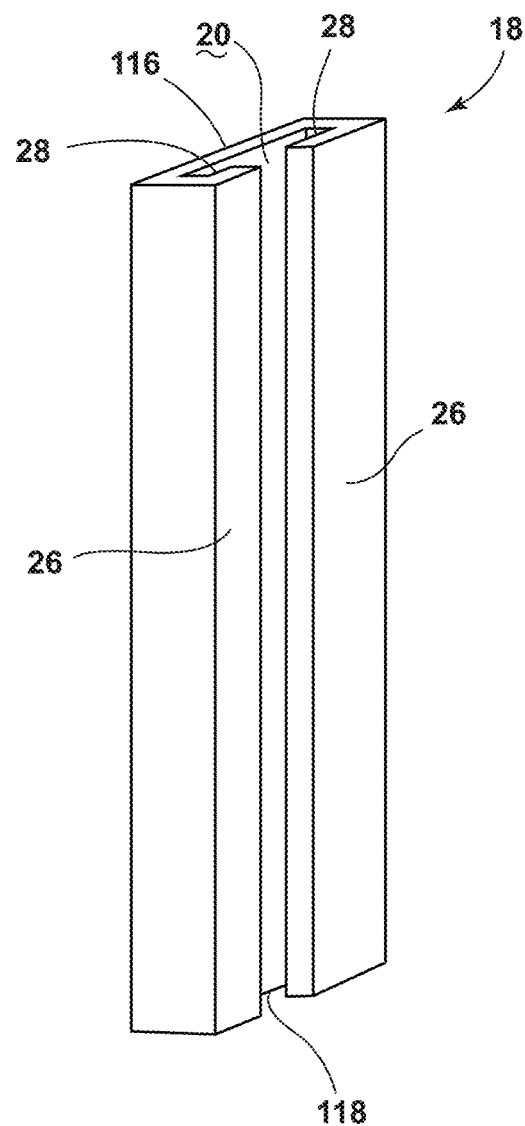
FIG. 5B is a front top perspective view of the rail of FIG. 5A.

For purposes of description herein, the terms "upper," "lower," "right," "left," "rear," "front," "vertical," "horizontal," "interior," "exterior," and derivatives thereof shall relate to the disclosure as oriented in FIG. 1. However, it is to be understood that the disclosure may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

Referring to FIGS. 1-13, reference number 10 generally refers to a vehicle that includes a vehicle floor 12 and a pillar 14 operably coupled to the vehicle floor 12. A handle assembly 16 is proximate to the vehicle floor 12 and is operably coupled to the pillar 14. The handle assembly 16 includes a rail 18 that has a first surface 20, a second surface 22, and a plurality of apertures 24 defined along the first and second surfaces 20, 22. The first surface 20 includes retention flanges 26 that each define a channel 28 along the first surface 20. A latch feature 30 is selectively disposed within at least one of the plurality of apertures 24. The latch feature 30 includes a retention member 32 to couple to a pivot feature 34 and also includes a lever 36. A handle 38 is operably coupled to the latch feature 30. The handle 38 includes a body 40 that defines a grasping portion 42 and at least one attachment end 44.

Referring now to FIGS. 1-4, the vehicle 10 includes a vehicle body 50 that defines an interior 52 of the vehicle 10 having a passenger compartment 54 therein. The passenger compartment 54 may include a first seating row 56 and a second seating row 58. Fewer or more seating rows may be included in the vehicle 10, without departing from the teachings herein. The first seating row 56 may include a driver seat 60 and a passenger seat 62, and the second seating row 58 may include rear passenger seats 64. The rear passenger seats 64 of the second seating row 58 may include bucket seating or may be bench seating. The vehicle body 50 also includes front doors 66 that provide access to the first seating row 56 and rear passenger doors 68 that provide access to at least the second seating row 58.

The vehicle body 50 includes an A-pillar 70 proximate to each of the driver seat 60 and the passenger seat 62 to which the front doors 66 are coupled. The vehicle body 50 may also include a B-pillar 72, a C-pillar 74, and a D-pillar 76. The B-pillar 72 is typically positioned between the first seating row 56 and the second seating row 58, and the C-pillar 74 is positioned proximate to the second seating row 58. Typically, the rear passenger doors 68 are coupled to the B-pillar 72, and the B-pillar 72 can include a latch for the front doors 66. In some vehicle configurations, the C-pillar 74 may be positioned between the second seating row 58 and a cargo space 78 of the vehicle 10.

The D-pillar 76 is typically utilized in larger vehicles, such as sport-utility vehicles, such that the cargo space 78 may be generally accessible from the second seating row 58. Additionally or alternatively, the rear passenger seats 64 of the vehicle 10 may be positioned proximate to the cargo space 78 (FIG. 12) and the D-pillar 76. The D-pillar 76 may be positioned near a rear portion 80 of the vehicle 10 proximate to a cargo door 82. It is generally contemplated that the pillar 14 described herein may be any one of the A-pillar 70, the B-pillar 72, the C-pillar 74, or the D-pillar 76. For purposes of this disclosure, the pillar 14 described herein will be described in relation to the B-pillar 72. Specifically, the pillar 14 described may be used in a pillar assembly 84 for the vehicle 10. The pillar assembly 84 can include, at least, the pillar 14, the handle assembly 16, and a trim panel 86, each described further below.

With further reference to FIGS. 1-4, the vehicle 10 includes the handle assembly 16 operably coupled to the pillar 14, which may be proximate to one of the rear passenger doors 68 of the vehicle 10. It is generally contemplated that the handle assembly 16 is positioned proximate to the vehicle floor 12 and is generally configured to assist an occupant in entering and exiting the vehicle 10 proximate to the vehicle floor 12. The handle assembly 16 may be positioned proximate to the vehicle floor 12 to provide greater accessibility for a potential occupant. It is also contemplated that a separate assistance handle 88 may be coupled to the pillar 14 proximate to an upper portion 90 of one of the rear passenger doors 68, such that an occupant may alternatively utilize the separate assistance handle 88 when entering and exiting the vehicle 10.

The trim panel 86 is operably coupled to the pillar 14 and generally conceals the rail 18 and the pillar 14. The trim panel 86 includes an outer surface 92 and an inner surface 94 and is operably coupled to the pillar 14 via retention clips 96. The trim panel 86 defines an aperture 98 that may be approximately the same length as the rail 18 of the handle assembly 16. The handle 38 of the handle assembly 16 is operably coupled to the outer surface 92 of the trim panel 86 and extends through the aperture 98 to couple to the rail 18. The handle 38 may move along the trim panel 86 within the aperture 98 while being coupled to the pillar 14 via the rail 18.

As mentioned above, the aperture 98 defined by the trim panel 86 extends along a length generally equivalent to the length of the rail 18. The aperture 98 provides a space within which the handle 38 can translate, so the handle 38 can move upward and downward relative to the trim panel 86. The handle 38 moves along the trim panel 86 within the aperture 98 to adjust the position of the handle 38. The adjustment of the handle 38 maximizes the assistance available for the occupant. The adjustment of the handle 38 is described in more detail below.

Referring to FIGS. 4-7, the handle assembly 16 includes the rail 18, the latch feature 30, and the handle 38. The rail 18 is disposed behind the trim panel 86 and is operably coupled to the pillar 14. The rail 18 may extend along a length of the pillar 14 and may be generally positioned along a lower portion 110 of the pillar 14. The rail 18 is coupled to the pillar 14 via fasteners 112 that extend through the holes 114 defined on the first surface 20 of the rail 18. As mentioned above, the rail 18 includes the first surface 20 and the second surface 22 and defines the plurality of apertures 24 along the first and second surfaces 20, 22. The plurality of apertures 24 are illustrated as defining at least three apertures 24 along the rail 18. It is generally contemplated that the plurality of apertures 24 may include more than three apertures 24 and/or less than three apertures 24 depending on the overall size of the vehicle 10 (FIG. 1) and desired adjustability of the handle 38.

The first surface 20 also includes the retention flanges 26, which each define the channels 28 along the first surface 20. The rail 18 also includes a first end 116 and a second end 118. As illustrated, the second end 118 includes a retention hook 120 that is configured to operably couple the rail 18 to the pillar 14. The pillar 14 may define a corresponding slot 122 through which the retention hook 120 may extend to engage the pillar 14 and retain the rail 18.

The retention hook 120 is illustrated as including an extending portion 124 integrally formed with a central resilient member 126. The central resilient member 126 is further coupled to a retention tab 128. The extending portion 124 couples the central resilient member 126 and the retention tab 128 to the second end 118 of the rail 18. The retention tab 128 can be disposed within the slot 122 defined by the pillar 14. For example, the retention hook 120 may retain the rail 18 and properly align the rail 18 to the pillar 14 so the fasteners 112 can be placed to fix the rail 18 to the pillar 14. The central resilient member 126 may provide additional flexibility that may assist in the at least partial retention of the rail 18 and the pillar 14. By way of example, not limitation, the retention hook 120 may be disposed within the slot 122 during assembly of the handle assembly 16 to retain the rail 18 proximate to the pillar 14. The central resilient member 126 may flex to accommodate the weight of the rail 18 before the rail 18 is fixed to the pillar 14 via the fasteners 112.

Referring to FIGS. 5-8, the latch feature 30 is operably coupled to the rail 18 and includes an attachment portion 140 and an adjustment portion 142. The latch feature 30 includes translational members 144 disposed within each of the channels 28 defined by the retention flanges 26 of the rail 18. The translational members 144 are configured to engage the first surface 20 of the rail 18 during operation of the handle assembly 16, described below. The translational members 144 may include wheels, glides, or other translational members 144 generally known in the art.

The attachment portion 140 of the latch feature 30 defines an attachment aperture 146 that may receive the handle 38 to at least partially couple the handle 38 to the latch feature 30. The handle 38 is operably coupled to the attachment portion 140 of the latch feature 30, such that the attachment portion 140 is disposed within the at least one attachment end 44 of the handle 38. It is generally contemplated that the handle 38 may be fixedly coupled to the latch feature 30 and operably coupled to the rail 18 via the latch feature 30. Stated differently, the handle 38 is fixed to the latch feature 30, and the handle 38 and the latch feature 30 are movable along to the rail 18. The adjustment portion 142 of the latch feature 30 may include the retention member 32, which is selectively engaged with the rail 18.

The at least one attachment end 44 of the handle 38 includes a first attachment end 150 and a second attachment end 152 with the body 40 defined therebetween. The handle 38 also includes an adjustment feature 154, which is operably coupled to the latch feature 30 via a cable 156. It is generally contemplated that the latch feature 30 extends through the aperture 98 defined by the trim panel 86 to retain the handle 38 proximate to the trim panel 86 and coupled to the rail 18. As mentioned above, the latch feature 30 includes the retention member 32 and the lever 36. The retention member 32 extends from the first attachment end 150 of the handle 38 through the aperture 98 defined by the trim panel 86 and operably coupled to the rail 18 via one of the plurality of apertures 24.

The retention member 32 is operable between an engaged position 158 and a retracted position 160. The retention member 32 is operably coupled to the rail 18 via one of the plurality of apertures 24, such that the retention member 32 extends through one of the apertures 24. The retention member 32 is coupled to the pivot feature 34 of the latch feature 30, which may be disposed within the first attachment end 150 of the handle 38. The pivot feature 34 is coupled to the retention member 32 and is configured to pivot the retention member 32 between the engaged position 158 and the retracted position 160. The retention member 32 is operable relative to the pivot feature 34 via the lever 36. The lever 36 is also coupled to the pivot feature 34, such that the lever 36 is configured to translate the retention member 32 via the pivot feature 34 between the engaged position 158 and the retracted position 160.

With further reference to FIGS. 5-9, the lever 36 is coupled to the adjustment feature 154 of the handle 38 via the cable 156. The handle 38 also includes an actuator 162, illustrated in detail in FIG. 9, which is operably coupled to the cable 156 and is configured to actuate the lever 36. The actuator 162 may be a button, a trigger, and/or other spring-like mechanisms configured to translate the lever 36 of the latch feature 30. The actuator 162 may be operably coupled to the adjustment portion 142 of the latch feature 30 via the cable 156 to selectively operate the lever 36 and the retention member 32. It is also contemplated that the lever 36, the retention member 32, and the pivot feature 34 can be disposed within the first attachment end 150 of the handle 38. The lever 36 and the retention member 32 are translated between the engaged position 158 and the retracted position 160 via actuation of the adjustment feature 154 by the actuator 162. Stated differently, the user may press on the actuator 162 to engage the adjustment feature 154 of the handle 38 to retract the cable 156 and, thus, retract the retention member 32 and the lever 36 of the latch feature 30.

With reference to FIGS. 6-10, to adjust the height of the handle 38, the occupant can engage the actuator 162 of the handle 38, which engages the adjustment feature 154. The adjustment feature 154 pulls, or otherwise retracts, the cable 156 to engage the lever 36 and pivot the pivot feature 34. As the cable is retracted, the lever 36 and the pivot feature 34 rotate to retract the retention member 32. The retention member 32 is thus removed from one of the apertures 24 and is uncoupled from the rail 18 in the retracted position 160. While the retention member 32 is in the retracted position 160, the handle 38 can transition from a first position 164 to one of a plurality of second positions 166. The first position 164 is generally defined as the starting position of the handle 38, and the second position 166 is the newly selected position. The handle 38 can pass through a plurality of intermediate positions between the first and second positions 164, 166. The selection of the second position 166 is aided by the positioning of the retention member 32 in one of the apertures 24. The alignment of the retention member 32 with one of the apertures 24 provides a poka-yoke design that provides tactile feedback for the user to indicate the retention member 32 is in the engaged position 158.

As generally set forth above, the first attachment end 150 is operably coupled to the latch feature 30. The second attachment end 152 can include a retention block 170. The retention block 170 is disposed between each of the retention flanges 26 and at least partially extends into each of the channels 28 defined by the retention flanges 26. The retention block 170 is slidably coupled to the retention flanges 26 of the rail 18. It is generally contemplated that the retention block 170 may have a T-shaped configuration, such that the retention block 170 includes a central body 172 and outwardly extending engagement features 174. The engagement features 174 extend into the channels 28 of each of the retention flanges 26 to generally centrally retain the body 40 of the handle 38 relative to the rail 18. By way of example, and not limitation, the occupant may grab the handle 38 along the grasping portion 42 and apply a force upon the handle 38. Stated differently, the user may grasp onto the grasping portion 42 of the body 40 of the handle 38 when entering and/or exiting the vehicle 10 (FIG. 1).

The retention block 170 may then engage the rail 18 to centrally retain the handle 38. The retention block 170 generally translates within the channels 28 defined by the retention flanges 26 as the latch feature 30 and the handle 38 translate along the rail 18. The retention block 170 may at least partially engage the first surface 20 of the rail 18 and, depending on the force applied to the handle 38, the retention flanges 26 as the handle 38 transitions along the rail 18. Specifically, the retention block 170 is generally configured to retain the second attachment end 152 of the handle 38 within the retention flanges 26 of the rail 18 to securely couple the handle 38 to the rail 18.

As illustrated in FIGS. 6-10, the handle 38 is illustrated as a single unitary body with the grasping portion 42 defined by the body 40 and having the first attachment end 150 and the second attachment end 152 coupled to the rail 18. However, it is also contemplated that the handle 38 may have alternative configurations, such as that depicted in FIG. 10. For example, in FIG. 10, the body 40 of the illustrated handle 38 is configured as a loop strap operably coupled to the attachment end 44, which is operably coupled to the latch feature 30. In such a configuration, the attachment end 44 includes the actuator 162, which operably translates the retention member 32 from the engaged position 158 to the retracted position 160, such that the loop strap handle 38 may be translated along the rail 18 between the first position 164 and the second position 166. It is generally contemplated that the overall operation of the handle assembly 16 remains the same whether the handle 38 is a single unitary body or a loop strap coupled to the rail 18. Each configuration and orientation of the handle 38 may be utilized with various configurations of the handle 38, including, but not limited to, the loop strap.

Figure 6:
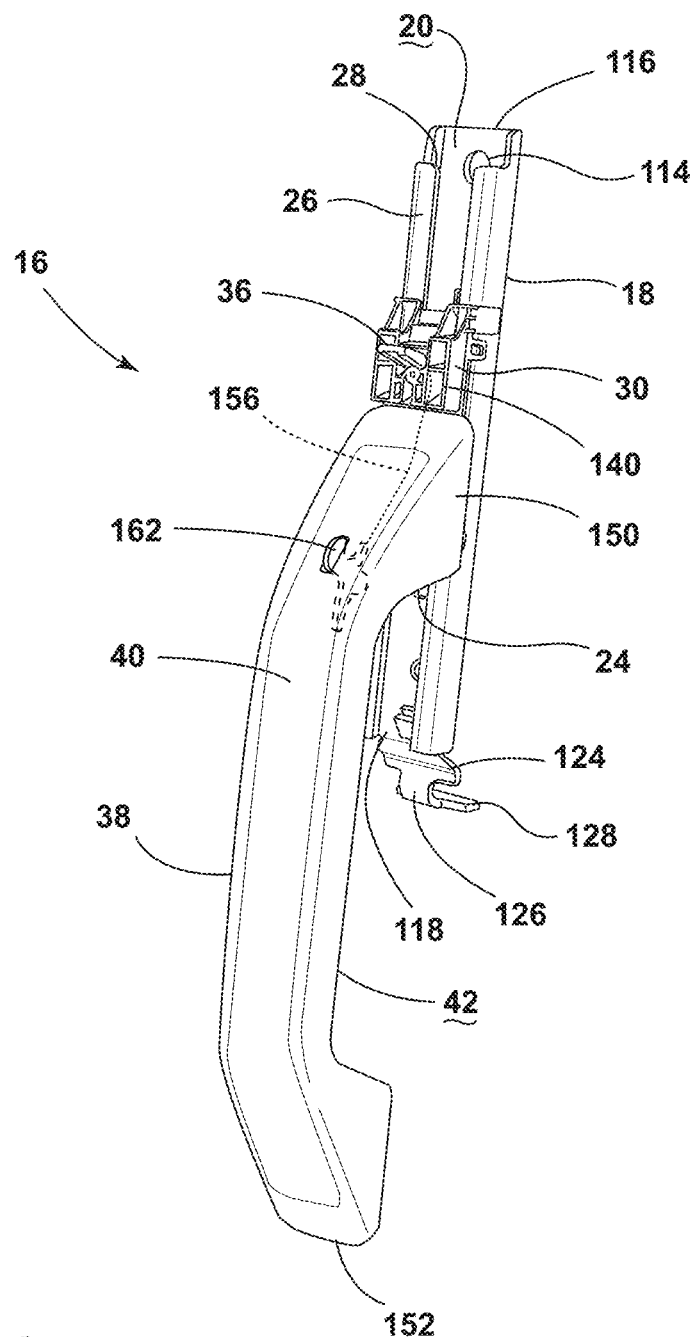
FIG. 6 is a side perspective view of a handle assembly of the present disclosure.
Figure 7:
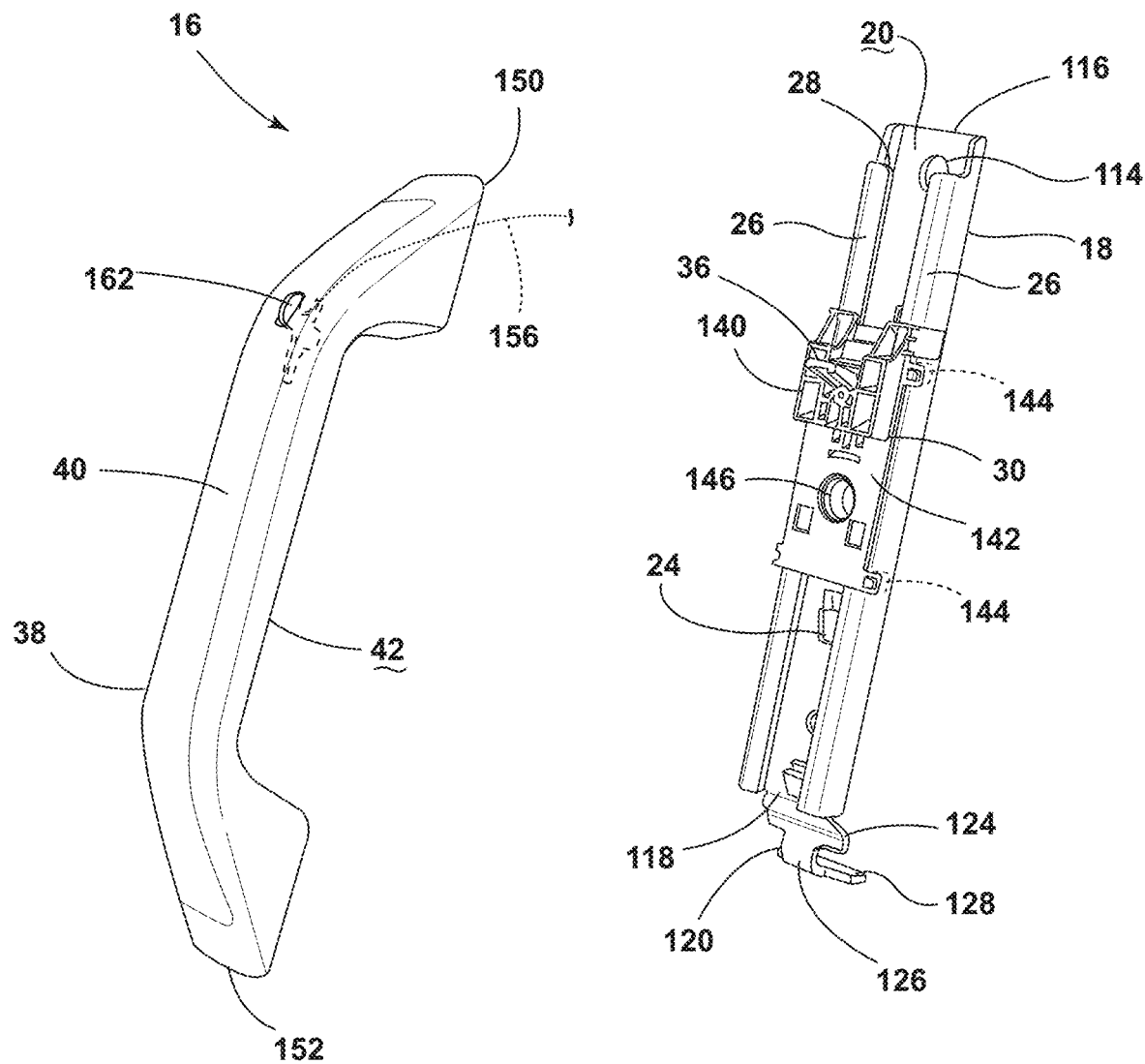
FIG. 7 is an exploded side perspective view of the handle assembly of FIG. 6.
Figure 9:
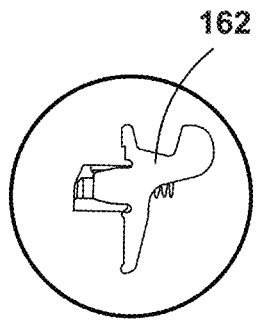
FIG. 9 is an enlarged side perspective view of an actuator of the handle assembly of FIG. 8 taken at area IX.
Figure 8:
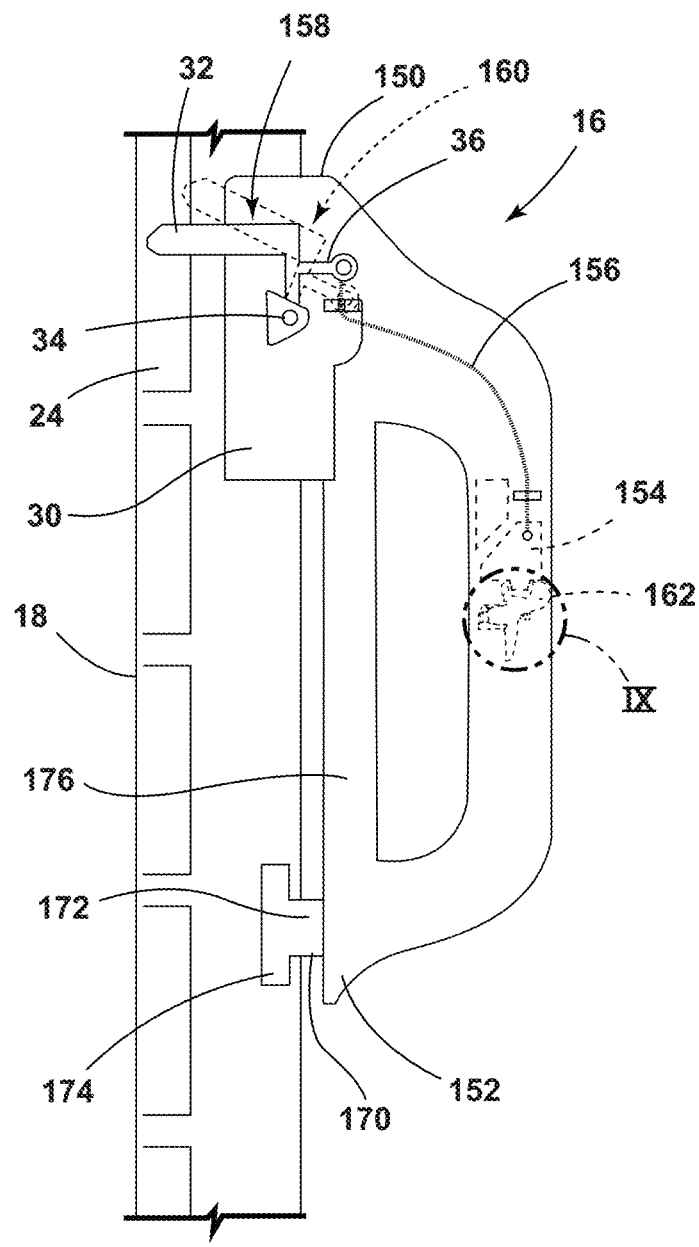
FIG. 8 is a partial side cross-sectional view of an aspect of a handle assembly of the present disclosure.
Figure 10:
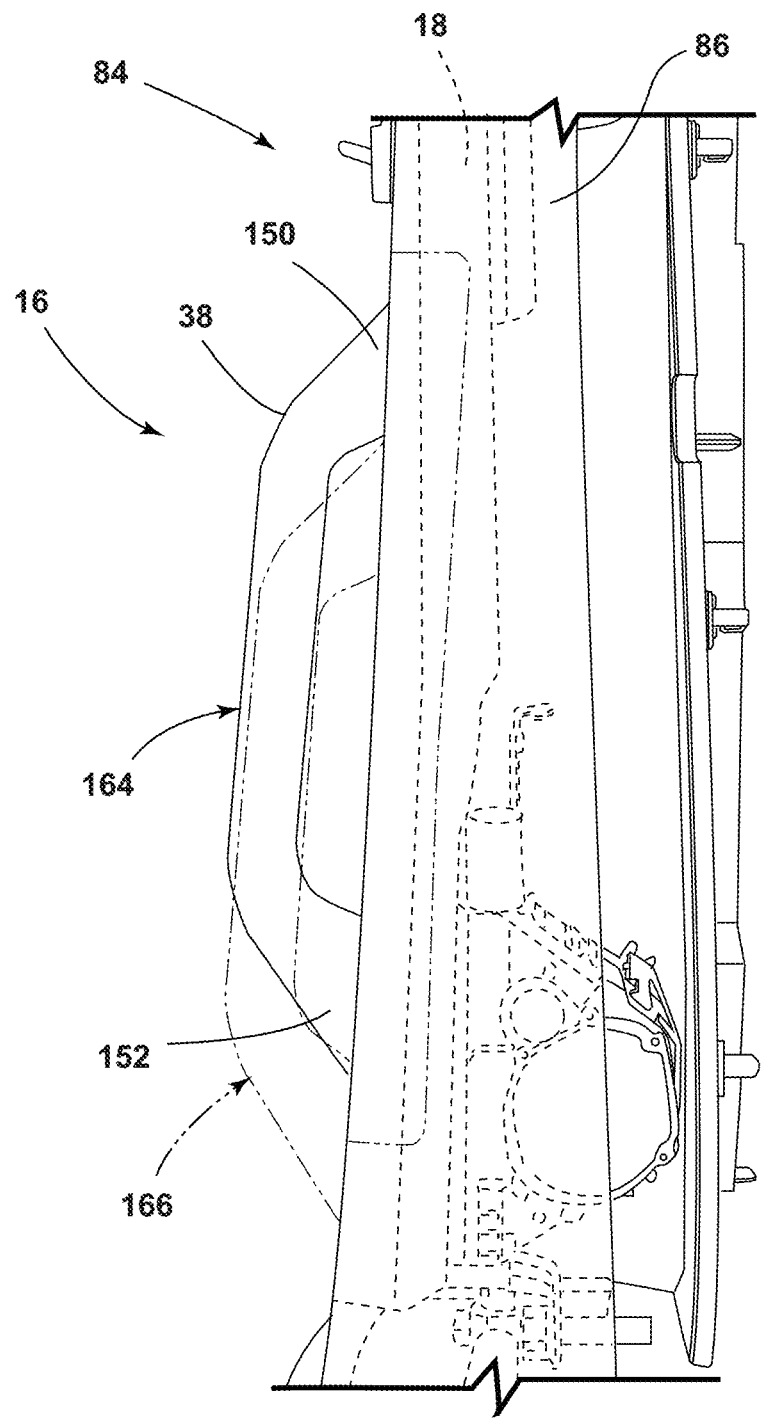
FIG. 10 is a partial side perspective view of a handle of a handle assembly of the present disclosure in a first position and the handle in a second position illustrated in phantom.
Figure 11:
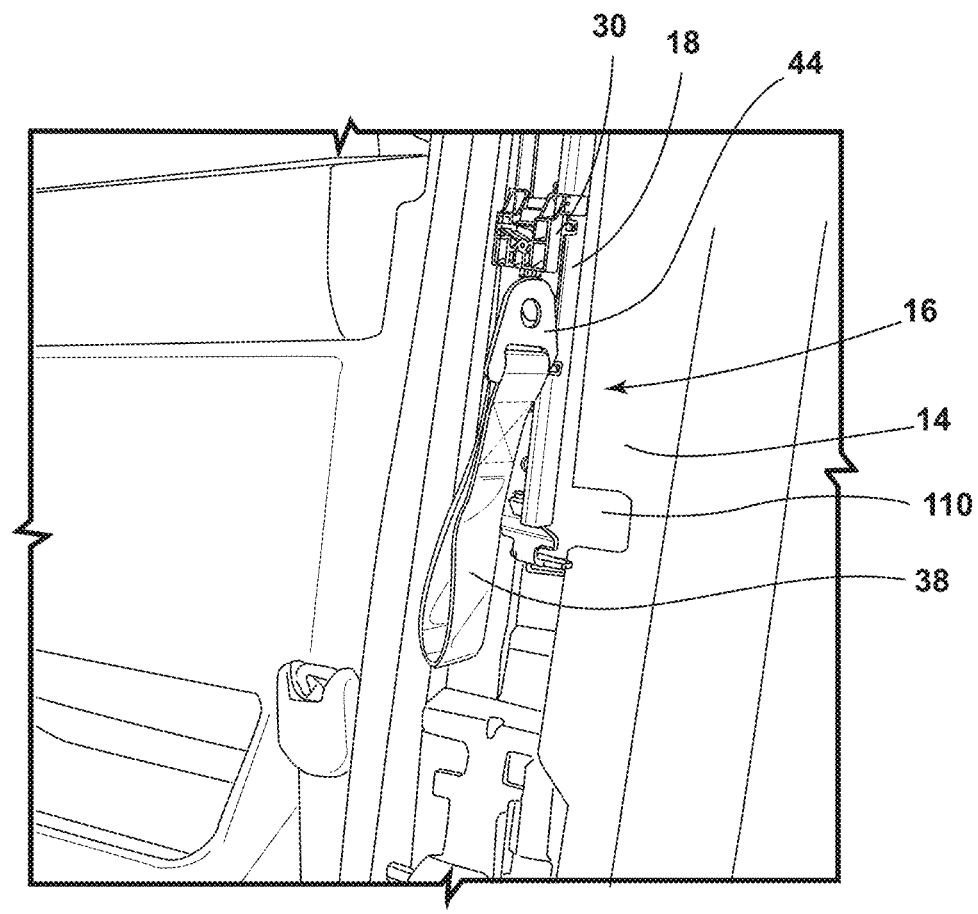
FIG. 11 is a partial enlarged side perspective view of a handle assembly of the present disclosure with a loop strap.

With reference to FIG. 8, the handle 38 may include a base attachment 176 that generally extends between the first attachment end 150 and the second attachment end 152 to conceal the aperture 98 defined by the trim panel 86. In such configuration, the handle 38 generally has a D-shaped configuration. Additionally or alternatively, the handle 38 may have a C-shaped configuration, such that the first attachment end 150 and the second attachment end 152 remain separate from one another, as illustrated in FIGS. 6 and 7.

Figure 12:
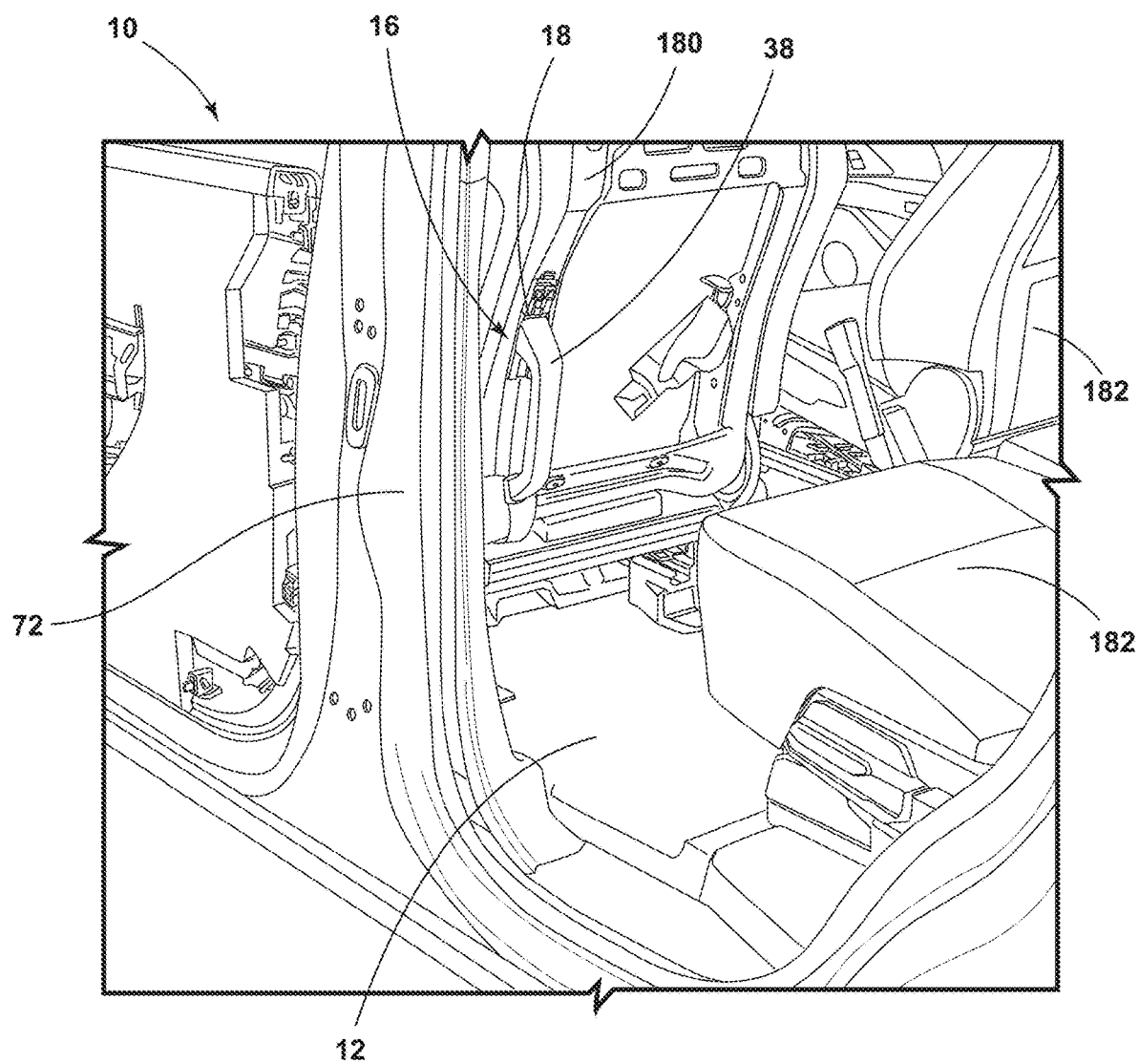
FIG. 12 is a partial enlarged side perspective view of a handle assembly of the present disclosure on a seating assembly.
Figure 13:
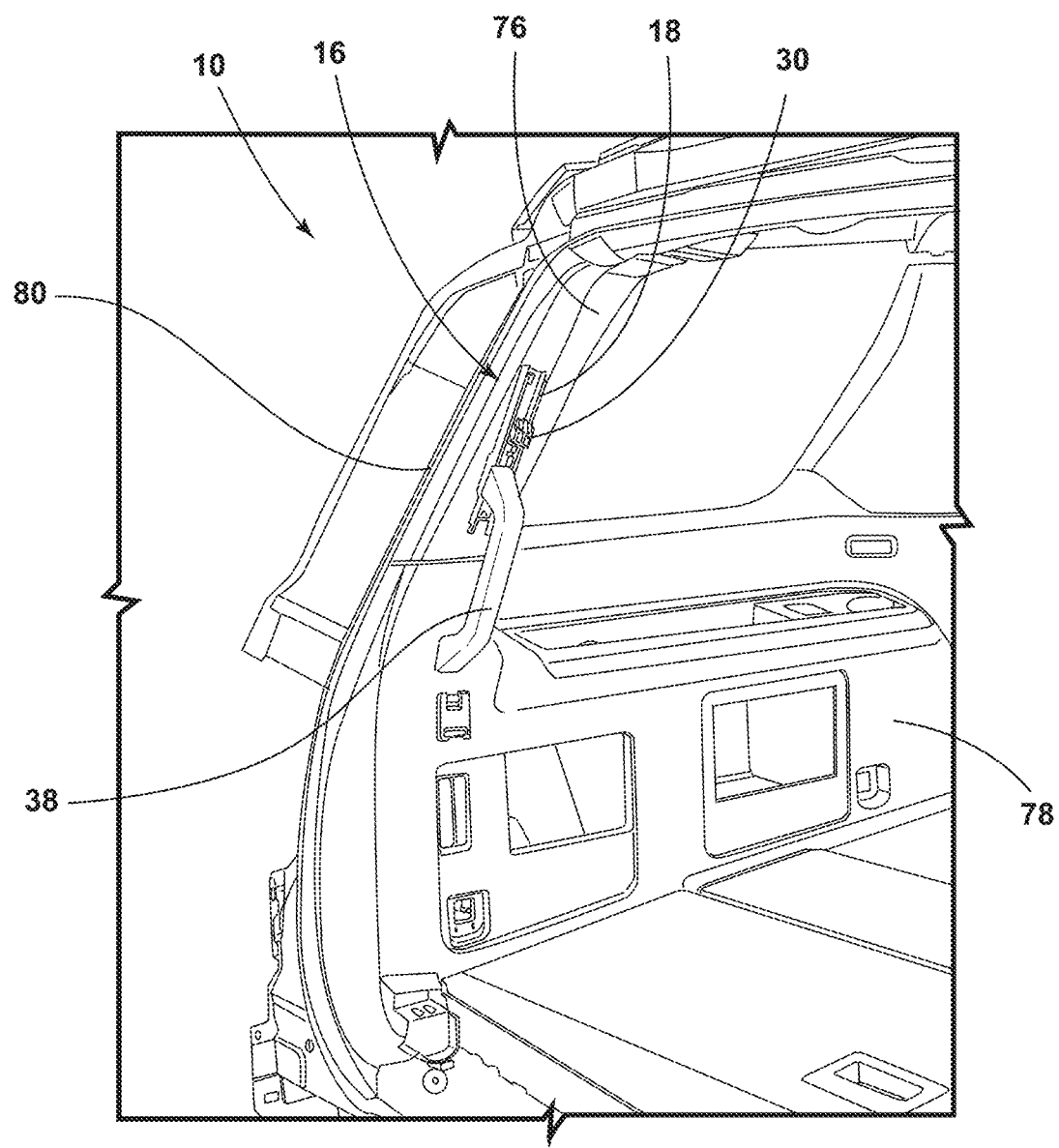
FIG. 13 is a partial rear perspective view of a vehicle with a handle assembly of the present disclosure disposed in a cargo space.

Referring again to FIGS. 1-13 and as mentioned above, the handle assembly 16 is operably coupled to the B-pillar 72 proximate to at least one of the rear passenger doors 68. It is also contemplated that the handle assembly 16 may be operably coupled to a seat frame 180 of either or both of the driver seat 60 and/or the passenger seat 62 of the first seating row 56. As illustrated in FIG. 12, the rail 18 may be coupled to the seat frame 180, and the handle assembly 16 is operably coupled to the rail 18 in a similar manner as described above. It is generally contemplated that a seat covering 182 may extend between at least a portion of the handle 38 and the rail 18. It is further contemplated that the handle assembly 16 may be operably coupled to any one of the pillars 14 described above. For example, as illustrated in FIG. 13, the handle assembly 16 may be coupled to the D-pillar 76 within the cargo space 78 to assist the user in entering or exiting the cargo space 78 during loading and/or unloading of the vehicle 10. Thus, the handle assembly 16 may be utilized in various locations around the vehicle 10 to assist in occupant with entering or exiting the vehicle 10.

With further reference again to FIGS. 1-13, the handle assembly 16 provides a greater range of assistance for an occupant of the vehicle 10 at least when entering the vehicle 10. The positioning of the handle assembly 16 proximate to the vehicle floor 12 allows the occupant to have a lower point of assistance. Further, positioning the handle assembly 16 on the seat frame 180 can provide further flexibility for the occupant by placing the handle assembly 16 further in the interior 52 of the vehicle 10, thus providing additional leverage for the occupant. In addition, placing the handle assembly 16 in the cargo space 78 may assist the occupant in entering and/or exiting the cargo space 78 during potential reorganization of items that may be disposed within the cargo space 78 or other adjustments within the cargo space 78. The overall selective adjustability of the handle 38 along the rail 18 allows the user to customize the position of the handle 38. The customization of the handle 38 position maximizes the accessibility of the handle assembly 16 in assisting the occupant.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

Furthermore, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected" or "operably coupled" to each other to achieve the desired functionality, and any two components capable of being so associated can also be viewed as being "operably couplable" to each other to achieve the desired functionality. Some examples of operably couplable include, but are not limited to, physically mateable and/or physically interacting components and/or wirelessly interactable and/or wirelessly interacting components and/or logically interacting and/or logically interactable components. Furthermore, it will be understood that a component preceding the term "of the" may be disposed at any practicable location (e.g., on, within, and/or externally disposed from the vehicle) such that the component may function in any manner described herein.

Modifications of the disclosure will occur to those skilled in the art and to those who make or use the disclosure. Therefore, it is understood that the embodiments shown in the drawings and described above are merely for illustrative purposes and not intended to limit the scope of the disclosure, which is defined by the following claims, as interpreted according to the principles of patent law, including the doctrine of equivalents.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A vehicle, comprising:
    a vehicle floor;
    a pillar coupled to the vehicle floor; and
    a handle assembly proximate to the vehicle floor and operably coupled to the pillar, the handle assembly comprising:
        a rail facing vehicle rearward and having a first surface, a second surface, and a plurality of apertures defined along the first and second surfaces, the first surface including retention flanges that define a channel along the first surface;
        a latch feature selectively disposed within at least one of the plurality of apertures, the latch feature including a retention member coupled to a pivot feature, the latch feature also including a lever;
        a cable operably coupled to the lever and configured to translate the retention member between an engaged position and a retracted position; and
        a handle extending vehicle rearward and operably coupled to the latch feature and including a body that defines a grasping portion and at least one attachment end, wherein the handle includes an adjustment feature operably coupled to the latch feature via the cable, the adjustment feature configured to translate the retention member between an engaged position and a retracted position, and wherein the handle further includes an actuator operably coupled to the cable and configured to actuate the lever of the latch feature.

2. The vehicle of claim 1, wherein the handle includes a loop strap operably coupled to the latch feature.

3. The vehicle of claim 1, wherein the handle is operable between a first position and a plurality of second positions.

4. The vehicle of claim 3, wherein the retention member is in a retracted position as the handle translates from the first position to one of the plurality of second positions.

5. A handle assembly for a vehicle, comprising:
    a rail facing vehicle rearward and including retention flanges that each define a channel;
    a handle extending vehicle rearward and disposed within the channel and operably coupled to the rail, the handle including a body that defines a grasping portion and at least one attachment end;
    a latch feature operably coupled to the at least one attachment end of the handle, the latch feature including a retention member coupled to a pivot feature, the latch feature also including a lever; and
    a cable operably coupled to the lever of the latch feature and configured to translate the latch feature between an engaged position and a retracted position, wherein die handle includes an adjustment feature and an actuator operably coupled to the adjustment feature, and wherein the adjustment feature is configured to translate the latch feature between an engaged position and a retracted position.

6. The handle assembly of claim 5, wherein the rail has a first surface, a second surface, and a plurality of apertures defined along the first and second surfaces.

7. The handle assembly of claim 6, wherein the retention member is selectively disposed within at least one of the plurality of apertures defined by the rail.

8. The handle assembly of claim 5, wherein the handle is coupled to the rail at a first position and is configured to translate along the rail to a second position.

9. A pillar assembly for a vehicle, comprising:
a pillar coupled to a floor of said vehicle; and
a handle assembly operably coupled to the pillar proximate to the vehicle floor, the handle assembly comprising:
a rail facing vehicle rearward and having a first surface, a second surface, and a plurality of apertures defined along the first and second surfaces, the first surface including retention flanges that each define a channel along the first surface;
a handle facing vehicle rearward and operably coupled to the rail and at least one attachment end and a latch feature disposed proximate to the at least one attachment end, wherein the latch feature includes a retention member and a lever operably coupled to the at least one attachment end; and
a cable operably coupled to the lever and configured to translate the retention member between an engaged position and a retracted position, wherein the retention member is coupled to a pivot feature, and wherein the cable engages the lever to rotate the retention member via the pivot feature into the retracted position.

10. The pillar assembly of claim 9, wherein the handle is a loop strap.

11. The pillar assembly of claim 9, wherein the at least one attachment end includes a first attachment end and a second attachment end, and wherein the first attachment end includes the latch feature and the second attachment end includes a retention block slidably coupled to the retention flanges of the rail.

12. The pillar assembly of claim 9, wherein the handle is operable between a first position, a second position, and a plurality of intermediate positions therebetween.

* * * * *

UNITED STATES PATENT AND TRADEMARK OFFICE
CERTIFICATE OF CORRECTION

PATENT NO. : 11,548,426 B2
APPLICATION NO. : 17/111793
DATED : January 10, 2023
INVENTOR(S) : Zarraga et al.

It is certified that error appears in the above-identified patent and that said Letters Patent is hereby corrected as shown below:

In the Claims

Column 11:
Claim 5, Line 1;
"die" should be --the--.

Signed and Sealed this
Second Day of April, 2024

*Katherine Kelly Vidal*

Katherine Kelly Vidal
*Director of the United States Patent and Trademark Office*